(12) United States Patent
Olivier (10) Patent No.: US 6,990,719 B2
(45) Date of Patent: Jan. 31, 2006

(54) CONNECTION

(76) Inventor: Huey P. Olivier, 3817 Melancan Rd., Broussard, LA (US) 70518

( * ) Notice: Subject to any disclaimer, the term of this patent is extended or adjusted under 35 U.S.C. 154(b) by 0 days.

(21) Appl. No.: 10/303,608

(22) Filed: Nov. 25, 2002

(65) Prior Publication Data

US 2003/0075924 A1 Apr. 24, 2003

Related U.S. Application Data (60) Division of application No. 09/371,562, filed on Aug. 10, 1999, now Pat. No. 6,485,063, which is a continuation-in-part of application No. 08/972,516, filed on Nov. 18, 1997, now Pat. No. 6,047,997, which is a continuation-in-part of application No. 08/648,406, filed on May 15, 1996, now abandoned.

(51) Int. Cl.
*B21D 39/00* (2006.01)

(52) U.S. Cl. .......................... 29/456; 29/428

(58) Field of Classification Search ............... 29/428, 29/456, 433; 285/333, 334, 390, 355, 331
See application file for complete search history.

(56) References Cited

U.S. PATENT DOCUMENTS

| | | | | |
|---|---|---|---|---|
| 2,239,942 A | * | 4/1941 | Stone et al. ................. | 285/110 |
| 2,258,066 A | * | 10/1941 | Oyen ........................... | 285/328 |
| 3,870,351 A | * | 3/1975 | Matsuki ....................... | 285/334 |
| 4,113,290 A | * | 9/1978 | Miida .......................... | 285/334 |
| 4,577,895 A | * | 3/1986 | Castille ....................... | 285/334 |
| 4,813,717 A | * | 3/1989 | Watts .......................... | 285/333 |
| 5,092,635 A | * | 3/1992 | DeLange et al. ............ | 285/334 |
| 5,154,452 A | * | 10/1992 | Johnson ....................... | 285/333 |
| 5,454,605 A | * | 10/1995 | Mott ........................... | 285/333 |
| 5,829,797 A | * | 11/1998 | Yamamoto et al. .......... | 285/333 |
| 5,931,511 A | * | 8/1999 | DeLange et al. ............ | 285/334 |
| 5,964,486 A | * | 10/1999 | Sinclair ....................... | 285/331 |
| 6,047,997 A | * | 4/2000 | Olivier ........................ | 285/333 |
| 6,322,110 B1 | * | 11/2001 | Banker et al. ............... | 285/334 |
| 6,478,344 B2 | * | 11/2002 | Pallini et al. ................ | 285/333 |
| 6,485,063 B1 | * | 11/2002 | Olivier ........................ | 285/333 |
| 6,494,499 B1 | * | 12/2002 | Galle et al. .................. | 285/334 |
| 6,581,980 B1 | * | 6/2003 | DeLange et al. ............ | 285/334 |
| 6,626,471 B2 | * | 9/2003 | Mallis .......................... | 285/334 |
| 6,705,648 B1 | * | 3/2004 | Maruyama et al. .......... | 285/334 |
| 6,722,706 B2 | * | 4/2004 | Church ........................ | 285/334 |
| 6,848,724 B2 | * | 2/2005 | Kessler ........................ | 285/334 |
| 2002/0033603 A1 | * | 3/2002 | Pallini et al. ................ | 285/333 |
| 2003/0001388 A1 | * | 1/2003 | Hignett ........................ | 285/333 |

FOREIGN PATENT DOCUMENTS

GB 2234308 A * 1/1991

* cited by examiner

*Primary Examiner*—Essama Omgba (57) ABSTRACT

A drill string includes a plurality of tubular members each having a connection with a pin connector and a box connector on adjacent tubular members. The pin connector has an external thread with negative load flanks and positive stab flanks, adapted for threadingly engaging an internal thread second threads with negative load flanks and positive stab flanks on the box connector of the adjacent tubular member. The positive stab flanks have corner radiuses and the negative load flanks have radiuses forming a S-shape. The pin connector has an outer groove for receiving a protuberance on the terminal end of the box member forming locking shoulders. The protuberance and groove have contoured surfaces providing large metal-to-metal contact for preventing the contoured surfaces from sliding during over-torquing and cyclic bending of the drill string. The negative load flanks and locking shoulders lock the connection together. The negative load flanks absorbing the tension and the locking shoulders absorbing the compression on the connection.

20 Claims, 8 Drawing Sheets

CONNECTION

CROSS-REFERENCE TO RELATED APPLICATIONS

The present application is a divisional of U.S. patent application Ser. No. 09/371,562 filed Aug. 10, 1999 now U.S. Pat. No. 6,485,063 and entitled "Connection" which is a continuation-in-part of U.S. patent application Ser. No. 08/972,516 filed Nov. 18, 1997 now U.S. Pat. No. 6,047,997 and entitled "Connection" which is a continuation-in-part of U.S. patent application Ser. No. 08/648,406, filed May 15, 1996, now abandoned and entitled "Novel Locking Design", both hereby incorporated herein by reference.

BACKGROUND OF THE INVENTION

This invention relates to a connection for drill pipe and more particularly, pin and box connectors disposed on the ends of tubular members for connecting the tubular members for the drilling of bore holes in the pipeline and utility industry.

Drill strings are specifically designed for the installation of telephone lines, fiber optic cable, sewage lines, water lines, and similar installations relating to utilities for the pipeline and utility service industry. The typical objective is to drill a bore hole from point A to point B, generally under some type of obstacle or structure for the installation of a utility. Typically the bore hole distance drilled is between 200 and 600 feet. Also typically the bore hole is shallow and is generally horizontal.

In a typical drilling operation, a bit, such as a fishtail bit, is mounted on the end of the drill string with a transmitter located just behind the bit. The drill string is placed in compression and rotated to rotate and apply force on the bit to drill the bore hole. Fluids are circulated through the drill string and bit and then back up the annulus formed between the wall of the bore hole and drill string to moisten the earth through which the bit is drilling. This lessens the tendency for the drill string to stick in the bore hole. A hand-held receiver is located above ground to follow the transmitter and determine the orientation of the bit, i.e. inclination and azimuth. The operator then adjusts the orientation of the bit if the bit varies from the trajectory of the proper bore hole path between points A and B.

Once the bore hole is drilled under the obstacle, then the bit is removed and a reamer on a swivel is attached to the end of the drill string and the drill string and reamer are pulled back through the bore hole with the utility attached. The swivel is attached to the utility line such as a cable for example. The drill string is placed in tension as the reamer is pulled back through the bore hole with the utility attached.

The operator minimizes the amount of fluid that is circulated through the drill string because too much fluid into the surrounding earth bore is undesirable. If too much fluid is circulated through and around the drill string, the fluid begins to wash out the sand, dirt, and earth causing a washout underneath the obstacle or structure, such as a highway or waterway, under which the bore hole is being drilled. Structural problems will be created if a void is formed underneath a highway or some other structure.

Drill strings for the pipeline and utility industry are much different from that used in the oilfield. In oil field drilling, a drill string is used to drill a wide open bore hole. Drilling fluid is circulated to remove cuttings and cool the bit. Thus, it is important that the connections in the drill string be sealed from pressure and fluid. Typically it is not important whether there is fluid leakage through the connection in a drill string for the pipeline and utility industry. Thus the connections between joints of drill pipe are not required to seal against pressure or fluids and heat and pressure are not of concern. The only pressure is the pump pressure for flowing drilling fluid.

When designing the drill string and other related tubular goods for a particular drilling application, not only must the physical orientation of the drill string be taken into consideration, but also the desired use. The drill string may be placed in a horizontal orientation, or in a vertical orientation, or in a deviated position. The actual orientation depends on the type of application.

The successful drilling of bore holes in the pipeline and utility industry requires the assembly of many individual tubular members into a drilling string. The actual assembly entails the make-up and torquing of individual tubular members. The actual drilling process involves multiple make-ups and breakdowns of the connections between individual tubular members of the drilling string. The number of makes and breaks depends upon the environment and the operator. Typically, a connection will be made up and broke out four or five times a day and could be as high as six or seven times a day. Thus, a connection between joints of pipe may have a 1,000 or more makes and breaks a year and therefore must be robust and rugged to withstand such use. Also, the assembly is performed very quickly since time considerations are very important.

Design considerations for the connections for the drill string joints include, but are not necessarily limited to, the repetitive coupling and uncoupling of the connections, torquing, bending, cyclic loading, fatigue, tensile loads, and compressive strength. The connection typically includes threaded pin and box connections. The threads must be capable of making up easily with other threaded joints. The longevity of the individual thread is also very important for several reasons. First, once a thread begins to deform, further deformation is usually exponentially increased thereafter. Second, once the thread has deteriorated, the entire drill string must be disregarded since the length of the drill string has very limited variance. Third, failure of the thread while the drill string is in the process of actually drilling a bore hole will cause substantial monetary damage. The preceding list is meant to be only illustrative.

Despite these designs, when a drill string member has a thread that is used in multiple applications for the drilling of bore holes in the utility and pipeline industries, the mating shoulders may become flared due to over torquing. Also, the prior art designs result in the thread profile becoming deformed which in turn causes the external and internal thread design profiles to lose their make-up capability and results in premature failure. Once deformation begins, continued use exponentially increases mating problems between cooperating tubular members. Further, the pin and box are unscrewed, and thereafter, when made up again, the deformation forces will only be enhanced. In other words, the multiple screwing and unscrewing of the connections accelerates the deformation process so that once the deformation begins to occur, the process will thereafter exponentially increase.

Figure 1:
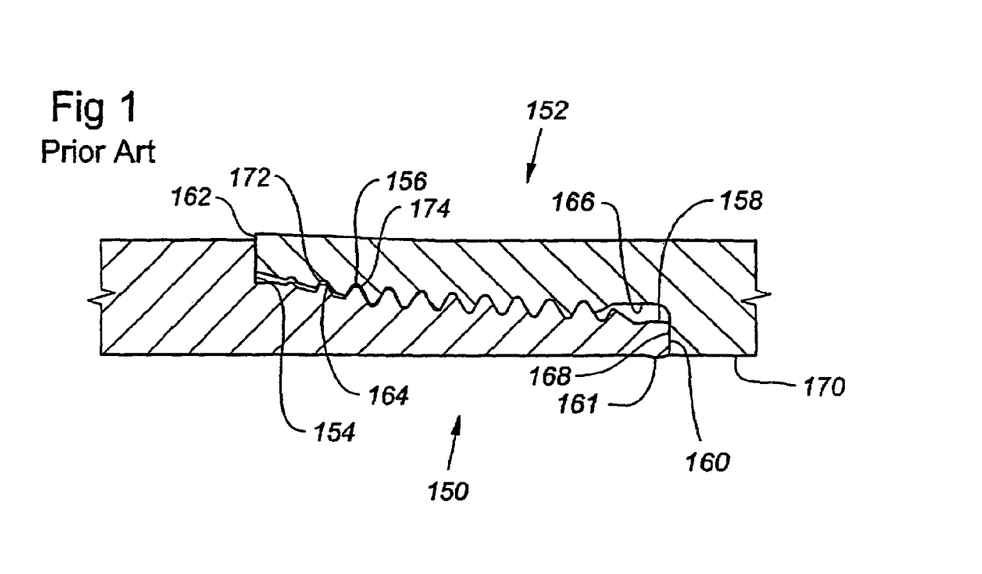
FIG. 1 is a cross-sectional view of a prior art connection showing flared threads.

FIG. 1 illustrates a prior art connection and the inherent problem with multiple fastening and unfastening of prior art connections in the utility industry due to over torquing and cycling of the box and pin. The prior art connection typically includes a pin end 150 for mating with a box end 152. The pin end 150 includes an annular shoulder 154 which is perpendicular to the axis of the connection. A round thread external thread profile 156 extends from shoulder 154 to an outer diameter 158. A radial terminal end 160, also perpendicular to the axis of the connection, extends from outer diameter 158 to an inner diameter 161.

The box end 152 includes a radial terminal end 162 having a surface which is perpendicular to the axis of the connection. A round thread internal profile 164 extends from terminal end 162 to an internal surface 166. A radial shoulder 168 extends from internal surface 166 to the internal diameter 170 of the tubular member.

As shown in FIG. 1, the radial terminal end 162 has slid on shoulder 154 and become deformed. One cause for this deformation may be the over torquing of the box 152 and pin 150 ends whereby the radial end 162 has been forced to slide outwardly on the face of shoulder 154 of the pin end 150. The forces thus applied may also deform the radial end 160 of the pin 150 such that the radial end 160 has been deformed, and in particular, by the outer surface 158 and the matching inner surface 161 being expanded outward by the compressive action of the radial shoulder 168 being forced into the radial end 160.

The pin and box are cut on a two inch cone taper. When the pipe string is driven, the outside cone of the box as the string is placed in compression, the outside cone of the box tends to drive outward at the base of the pin. Thus you are tight at the small end and loose at the large end when placed in compression. Thus, as the connection is placed under stress and incurs a cycling motion, the connection fatigues and breaks. The tubular members rocking on each other cause the connection to become loose.

The over torquing situation will also cause the thread profiles to no longer match properly. Thus, as shown in FIG. 1, a first gap 172 and a second gap 174 emerges. Of course, while FIG. 1 represents two gaps 172, 174, other gaps along the thread profile may in fact occur.

Figure 1A:
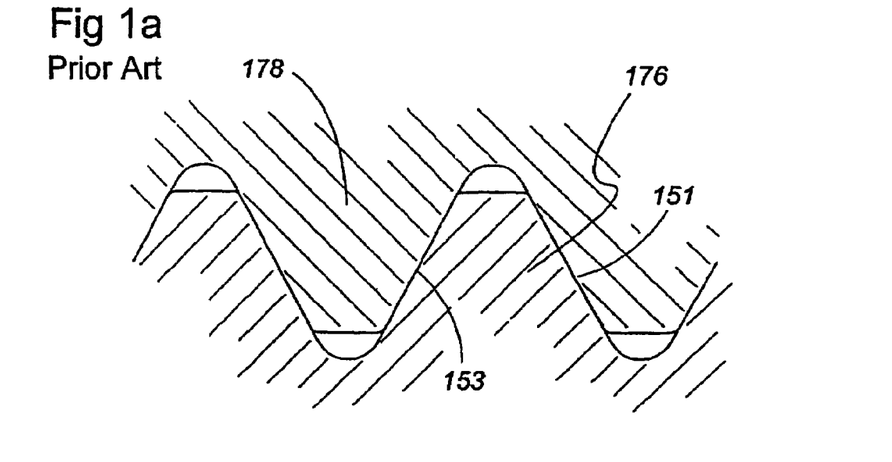
FIG. 1A is a cross-sectional enlarged view of prior art API threads for the connection of FIG. 1.

Typically prior art connections include standard API threads 176, 178 on the pin end 150 and box end 152, respectively, shown in FIG. 1A. API threads have positive flank angles on both the stab flanks 151 and load flanks 153. U.S. Pat. No. 5,154,452 discloses a tubular connection for the oilfield having a S-shaped thread profile providing a reverse angle thread form to withstand severe tension placed on the connection during drilling. However, the connection has very little compression capability.

Cyclic bending, also known as rocking, i.e. lateral forces allow the pin end 150 to move or slide relative to the box end 152, is another cause of the flaring so as to form gaps 172, 174. Ideally, there should be no abrupt change in the direction of drilling. However, many applications, such as deviated settings, produce several abrupt dog legs or kinks in the borehole due to the operator making abrupt changes in the direction of drilling. Abrupt changes in drilling trajectory causes tortuosity which is a term describing a borehole which has a twisted trajectory. Tortuosity substantially increases the cyclic bending, torque and drag on the drill string.

As the pipe rotates and passes through a bend or an arch in the trajectory of the bore hole, the drill string bends causing the mating surfaces of the connection to slide back and forth particularly at the rotary shoulders. The smaller the radius of the bend in the bore hole, the greater fatigue that will be placed on the pin. As the drill string becomes deviated and twisted, the rocking within the thread profile will be exacerbated. As the deformation increases, the rocking can only escalate.

As the pipe string passes around obstacles in the drilling path, it passes through steep bend radiuses. As the pipe string passes through the multiple severe bend radiuses, a bend is placed on the connection causing the threads to disengage on one side of the connection. As the connection passes through other bends, the connection bends in the other direction.

As the connection passes through these severe bends, the positive flank angles on the API threads 176, 178 act as ramps causing the threads to further engage causing the connection to get tighter. The positive thread flanks of the API thread allow rocking of the connection because the threads work into the roots. As the connection is rocking, there is a ramping action between the threads. This ramping action causes a yielding of the thread material and the thread member is stretched. The ramping of the threads cause yielding of the material and thus damage the connection. In other words, the thread material passes beyond its point of elasticity eventually causing the pin to be broken off. Rocking causes fatigue and pin breakage.

Once the reamer is connected to the end of the drill string and is being pulled back through the borehole, high tension is applied to the drill string and particularly the connections. As the reamer engages obstacles in the drilling path, bends and torque are placed on the connections causing the threads to open and close. As the threads are stretched apart, the connection is further tightened due to the torque placed on the string.

Each time the drill string is rotated once, it is called a cycle. The drill string rotates three to four hundred cycles per minute during the drilling operation. Each time the connection passes through a bend and rotates, the shoulders slide back and forth against each other. These repetitive cycles with sliding shoulders provides a continuing fatigue at the mid-portion of the pin. This causes substantial stress and causes the pin to break off at the connection. The pin tends to break near the base of the pin and is typical in the prior art joints. Once the pipe is rotated through an arch or bend in the bore hole, the terminal end of the box tends to slide away from the base of the pin. It tends to come apart as the two faces slide against each other. This causes the threads near the shoulder of the pin and the terminal end of the box to come apart. However, the connection continues to stay tight at the mid-portion of the threads. With the mid-threads holding tight and the shoulder of the pin and terminal end of the box rocking, the pin tends to break at the base. During one half of the cycle the pin is bent one way and then during the other half of the cycle it is bent the other way causing it to fatigue and break. This back and forth action causes tremendous fatigue. The pin typically breaks after a few thousand cycles. A corkscrew bore hole places peculiar bends and cycles on the drill string which may well double the bend radius capacity of the joint. All of these factors induce rapid fatigue in the connection.

Also, during the drilling process, a large amount of compressive force is placed on the drill string which tends to drive the terminal box end outwardly as the surfaces' slide. The greater this force, the greater the gap between the base of the pin and the terminal end of the box. However, the mid-portion of the threads remain tight. Then at every cycle, the counter-stretching back and forth begins to fatigue the connection.

If the environment is very bad and if you have an inexperienced operator, the operator tends to over-compensate and steers too hard. An inexperienced operator also makes a direct turn with the drill string. Once the inexperienced operator realizes that he has turned the drill string too much, then he makes an abrupt turn in the other direction. This causes a tortuosity in the hole being drilled. This places the drill string in a very serious bind as it is rotated through the bore hole. The number of cycles that the connection will last is diminished considerably.

Another of the problems of the prior art connection is its ability to withstand high torque. The operator often over torques the connections. An extreme amount of torque is applied to the connection as compared to the small diameter of the pipe causing a large amount of torque to then be applied to a small diameter drilling string. Further, as the pipe string passes through severe multiple bends, high inertia torque is placed on the connections as the pipe string passes around obstacles and forms severe multiple bends. Thus, the connection must also withstand high inertia torque.

In the oil field, the drilling operators are much more experienced and the distances being drilled are much greater. Also, more sophisticated equipment is used so that the drilling is more controlled. Further, experts are continuously monitoring the drilling. In the utility industry, often the operators are inexperienced and force the drill string to achieve a bore hole from point A to point B and do not drill a smooth bore hole. Operators in drilling utility lines are more interested in getting the job completed than they are the wear and tear on their equipment.

It is preferred to have no movement between the surfaces because when there is movement, fatiguing occurs. Once the surfaces begin to slip, then the stretching of the pin and box begins. The pin can absorb some stretching during the cycling of the drill string. If the stretch occurs within limits, fatigue does not set in. Once the stretching exceeds the limit, then the connection begins to fatigue and will break.

The connection of the present invention solves these and other problems and deficiencies of the prior art as will be more clear from the description of the advantages, features and embodiments that follow.

SUMMARY OF THE INVENTION

The invention includes a tubular string containing a first pipe having a pin connector and a second pipe having a box connector. The pin and box connectors have external and internal thread sets, respectively, which are adapted for threaded engagement upon make-up of the connection.

The pin connector includes a thread set having run-out threads adjacent its base and full height threads extending from the run-out threads to the pin end, and the box connector includes a thread set with full height threads. The thread sets have threads with stab flanks with a positive flank angle and load flanks with negative flank angle. The stab flanks have crest corner radiuses and root corner radiuses for guiding the threads into the roots. The load flanks are made up of a pair of continuous radiuses extending from the crest to the root. The load flanks lock the pin and box connectors together upon tension being applied to the connection.

In the preferred embodiment, the pin connector includes an external groove at the base of the external threads for receiving a protuberance on the terminal end of the box connector. The protuberance has a cross-section in the shape of a bull nose or radius which extends across the terminal end of the box connector. The groove on the pin connector has a radius sized to receive the protuberance upon the make-up of the connection. The mating protuberance and groove form a non-sliding engagement to substantially eliminate the sliding between the mating groove and protuberance.

In another embodiment, the pin and box connectors may include another non-sliding engagement between a protuberance and groove. The box end includes an internal groove adapted for receiving a protuberance on the terminal end of the pin connector. In this embodiment, there is effectively an external and internal groove and protuberance engagements on each connection.

An advantage of the present invention includes having the groove on the box connector match the protuberance on the pin connector. Another advantage includes the control of the swelling out of the box connector upon over-torquing and/or repetitive use.

Another advantage is that the entire length of the thread profile is engaged. A further advantage is that the connection may be used with different size drill strings. Still yet another advantage is the quick make-up of the various joints as well as providing for multiple make-up and break-down during drilling. Another advantage is that the thread life of the joint is increased.

A feature of the present invention includes a protuberance adapted for cooperation with the shoulder groove that allows for more metal-to-metal contact between the two joints thereby precluding flaring out of the box connector. The protuberance is generally in the form of an annular ring-like member having a bull nose cross-section. Another feature includes the protuberance being located on the box connector and the groove being located on the pin connector.

Yet another feature includes a second embodiment wherein the protuberance is disposed on both box and pin connectors with cooperating grooves on both box and pin connectors. Still yet another feature includes an embodiment wherein the protuberance is disposed on the pin connector only, and the groove is disposed on the box connector only. Still yet another feature includes the invention is applicable to different types of threads and uses.

One of the objectives of the present invention is to maximize the number of cycles of the pin connector by using a radius to reduce the sliding action of the box and pin rotary shoulders. The connection of the present invention, in typical use, will last a full year withstanding 1000 to 1500 make ups and break outs without fatiguing the pin connector. It will also increases the life of the threads.

The locking shoulders of the protuberance and groove take the compression and the thread sets of the connection take the tension. Sealing is not a concern with this kind of pipe. The biggest concerns are tension and high torque.

The negative flank angle of the load flanks locks the pin thread set and box thread set together in tension. Thus, the greater the tension placed on the connection, the greater the locking action between the load flanks of the threads. The negative flank angle not only prevents ramping but also increases the torque capacity of the connection and eliminates ramping such that there is no yielding and over torque. The radiused corners of the threads also prevents fatigue.

The negative flank angle and locking shoulders of the invention locks the connection together. Thus, there is less of a tendency for the thread sets to separate from each other. These features cause the threads to remain locked against each other thereby reducing the problem of yielding and over torque. Further, the load flanks and outer pin crests and box roots are also in locking engagement thereby increasing the torque capacity of the connection.

The flat thread roots and crests provide additional torque due to a maximum taper cone surface contact when the threads are made up. The flat roots and crests also prevent rocking.

The thread profile of the present invention addresses all of the critical elements of the working environment and the weaknesses of the prior art thread designs. The new thread profile prevents ramping, rocking and fatigue of the connection and also allows increased torque and most importantly increase the life of the pipe.

Other objects and advantages of the invention will appear from the following description.

BRIEF DESCRIPTION OF THE PREFERRED EMBODIMENTS

For a detailed description of a preferred embodiment of the invention, reference will now be made to the accompanying drawings wherein.

DESCRIPTION OF THE PREFERRED EMBODIMENTS

Figure 2:
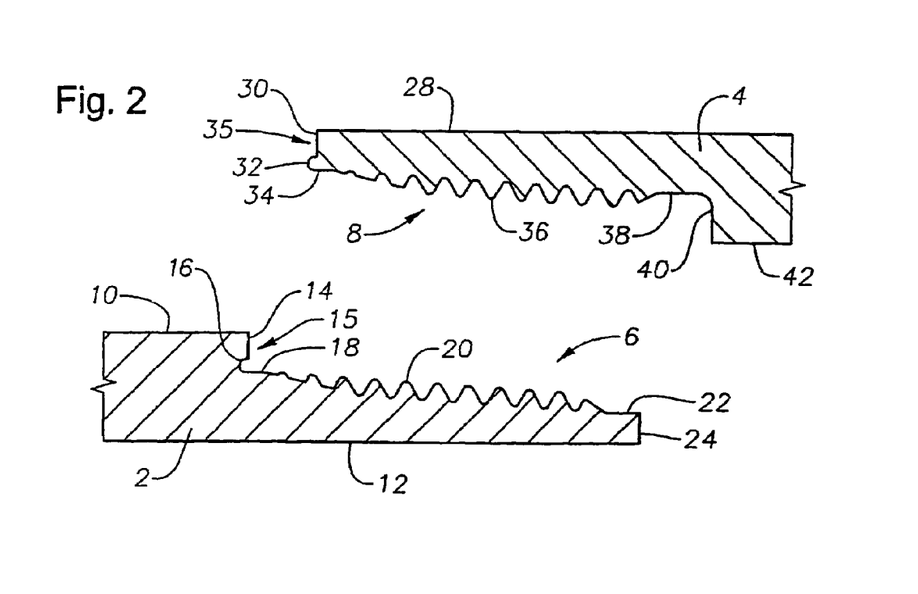
FIG. 2 is a cross-sectional view of a first preferred embodiment of the present invention.

Referring initially to FIG. 2, there is shown a preferred embodiment of the connection of the present invention for connecting two pipes or tubular members for assembling a drill string. As will be understood by those of ordinary skill in the art, each tubular member has a first end being referred to as the pin and a second end being referred to as a box. Two tubular members are shown in FIG. 2, a first tubular member 2 and a second tubular member 4. The first tubular member 2 has at one end a pin connector 6 of the present invention while the second tubular member 4 has at one end a box connector 8 of the present invention. The pin connector 6 is adapted for threaded connection to the box connector 8 to form the connection of the present invention as is hereinafter described in further detail. It should be appreciated, of course, that there is a box connector (not shown) on the other end of first tubular member 2 and a pin connector (not shown) on the other end second tubular member 4.

The first tubular member 2 is a generally cylindrical member or pipe having an outer diameter 10 and an inner diameter 12 with the pin connector 6 of the present invention on its terminal end. The pin connector 6 includes an outer annular shoulder 15 having an outer radial collar portion 14 and an adjacent inner annular groove 16 both facing in a direction which is generally transverse to the axis of the tubular member 2. An external thread profile 20 extends from an outer cylindrical surface 18 at the base of groove 16 to an outer cylindrical surface 22 adjacent the radial terminal end 24 of tubular member 2.

The second tubular member 4 is a generally cylindrical member or pipe having an outer diameter 28 and an inner diameter 42 with the box connector 8 of the present invention on its terminal end. The box connector 8 includes an inner annular shoulder 40 facing in a direction which is generally transverse to the axis of the tubular member 4. An internal thread profile 36 extends from an inner cylindrical surface 38 at the base of shoulder 40 to an inner cylindrical surface 34 adjacent the radial terminal end 35 of tubular member 4.

The radial terminal end 35 includes a collar portion 30 and an adjacent protuberance 32 in the form of a ring-like annular member adapted for insertion into groove 16 upon the threaded engagement of pin connector 6 and box connector 8. It should be noted that the protuberance shown includes a cross-section in the shape of a knob or radius; however, other shapes may be used such as an angled surface and wherein the groove 16 is adapted to cooperate with the angled surface. Further, the length and radius of the protuberance 32 may be varied, which in turn would vary the depth of the groove 16 with these variables being dependent on the amount of metal-to-metal surface contact desired.

Various types of thread sets may be used with the present invention. These are discussed in detail with respect to FIGS. 11–16 below.

In operation, pin connector 6 on tubular member 2 is stabbed into box connector 8 of tubular member 4. Upon the engagement of the thread profiles 20, 36, one of the tubular members 2, 4 is rotated with respect to the other to threadingly engage the connectors 6, 8. As the threading engagement continues, annular protuberance 32 is received into groove 16. As the connection is fully made up, protuberance 32 is fully received by and landed within groove 16 and terminal end 24 abuts annular shoulder 40. The surfaces of shoulder 15 and radial terminal end 35 are then fully engaged to inhibit sliding therebetween. The torque is then increased to fully make-up the connection.

Figure 3:
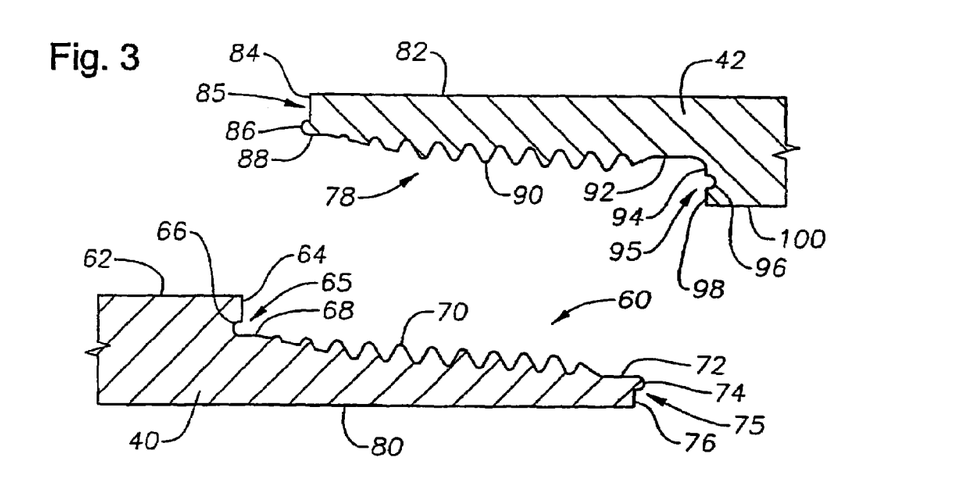
FIG. 3 is a cross-sectional view of a second preferred embodiment of the present invention.

Referring now to FIG. 3, there is shown another preferred embodiment of the connection of the present invention. In this alternative embodiment, a first tubular member 40 has at one end a pin connector 60 of the present invention and a second tubular member 42 has at one end a box connector 78. The pin connector 60 is adapted for threaded connection to the box connector 78 to form the connection of the present invention as is hereinafter described in further detail. It should be appreciated, of course, that there is a box connector (not shown) on the other end of first tubular member 40 and a pin connector (not shown) on the other end second tubular member 78.

The first tubular member 40 is a generally cylindrical member or pipe having an outer diameter 62 and an inner diameter 80 with the pin connector 60 of the present invention on its terminal end. The pin connector 60 includes an outer annular shoulder 65 having a radial collar portion 64 and an adjacent groove 66 both facing in a direction which is generally transverse to the axis of the tubular member 40. The groove 66 terminates at diameter surface 68 of tubular member 40. An external thread profile 70 extends from cylindrical surface 68 at the base of groove 66 to cylindrical surface 72 adjacent the radial terminal end 75 of tubular member 40.

The radial terminal end 75 includes a collar portion 76 and a protuberance 74 both which face in a direction generally transverse to the axis of tubular member 78. Protuberance 74 is a ring-like annular member having a cross-section in the shape of a knob or radius and adapted for insertion into groove 96 upon the threaded engagement of pin connector 60 and box connector 78 as hereinafter described.

The second tubular member 42 is a generally cylindrical member or pipe having an outer diameter 82 and an inner diameter 100 with the box connector 78 of the present invention on its terminal end. The box connector 78 includes an inner annular shoulder 95 having a collar portion 98 and an adjacent annular groove 96 both of which should face in a direction generally transverse to the axis of tubular member 78. The collar portion 98 extends from the inner diameter 100 to the groove 96. An internal thread profile 90 extends from cylindrical surface 92 at the base of groove 96 to cylindrical surface 88 adjacent the radial terminal end 85 of tubular member 42.

The radial terminal end 85 includes a collar portion 84 and a protuberance 86 which extends from the inner diameter surface 88 to collar portion 84 both of which should face in a direction generally transverse to the axis of tubular member 78. Protuberance 86 is a ring-like annular member having a cross-section in the shape of a knob or radius and adapted for insertion into groove 66 upon the threaded engagement of pin connector 60 and box connector 78 as hereinafter described.

In operation, pin connector 60 on tubular member 40 is stabbed into box connector 78 of tubular member 42. Upon the engagement of the thread profiles 70, 90, one of the tubular members 40, 42 is rotated with respect to the other to threadingly engage the connectors 60, 78. As the threading engagement continues, annular protuberance 86 on box connector 78 is first received into groove 66 of pin connector 60 and then protuberance 74 of pin connector 60 is received into groove 96 of box connector 78. As the connection is fully made up, protuberance 86 is fully received by and landed within groove 66 and protuberance 74 is fully received into and landed within groove 96. The surfaces of shoulder 65 fully engage radial terminal end 85 and the surfaces of shoulder 95 fully engage radial terminal end 75 to inhibit sliding during drilling. Further collar portions 64, 84 and 76, 98 are in abutting engagement. The torque is then increased to fully make-up the connection.

Figure 4:
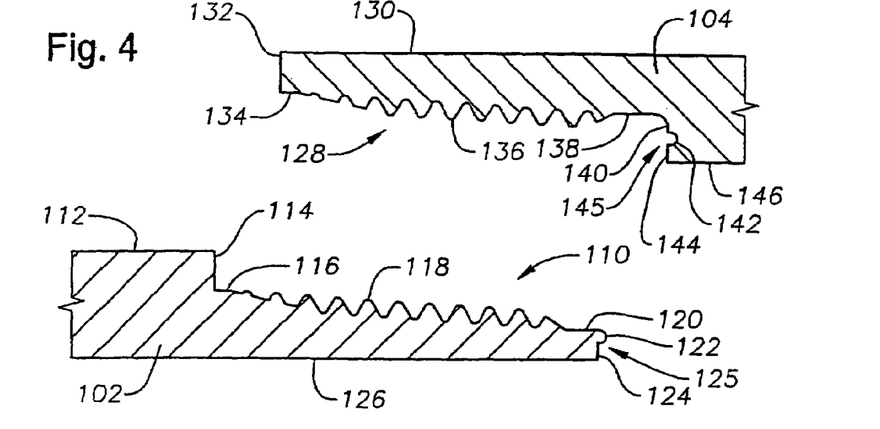
FIG. 4 is a cross-sectional view of a third preferred embodiment of the present invention.

Referring now to FIG. 4, there is shown another preferred embodiment of the connection of the present invention. In this alternative embodiment, a first tubular member 102 has at one end a pin connector 110 of the present invention and a second tubular member 104 has at one end a box connector 128. The pin connector 110 is adapted for threaded connection to the box connector 128 to form the connection of the present invention as is hereinafter described in further detail. It should be appreciated, of course, that there is a box connector (not shown) on the other end of first tubular member 102 and a pin connector (not shown) on the other end second tubular member 102.

The first tubular member 102 is a generally cylindrical member or pipe having an outer diameter 112 and an inner diameter 126 with the pin connector 110 of the present invention on its terminal end. The pin connector 110 includes an outer annular shoulder 114 generally perpendicular to the axis of the tubular member 102. The shoulder 114 extends from outer diameter 112 to cylindrical surface 116 of tubular member 102. An external thread profile 118 extends from cylindrical surface 116 at the base of shoulder 114 to cylindrical surface 120 adjacent the radial terminal end 125 of tubular member 102.

The radial terminal end 125 includes a collar portion 124 and a protuberance 122 both of which face in a direction generally transverse to the axis of tubular member 102. Protuberance 122 is a ring-like annular member having a cross-section in the shape of a knob or radius and adapted for insertion into groove 142 upon the threaded engagement of pin connector 110 and box connector 128 as hereinafter described.

The second tubular member 128 is a generally cylindrical member or pipe having an outer diameter 130 and an inner diameter 146 with the box connector 128 of the present invention on its terminal end. The box connector 128 includes an inner annular shoulder 145 having a collar portion 144 and an adjacent annular groove 142 both of which face in a direction generally transverse to the axis of tubular member 104. The collar portion 144 extends from the inner diameter 146 to the groove 142. An internal thread profile 136 extends from cylindrical surface 138 at the base of groove 142 to cylindrical surface 134 adjacent the radial terminal end 132 of tubular member 104.

The radial terminal end 132 is an annular shoulder which is generally perpendicular to the axis of tubular member 104. Radial terminal end 132 is adapted for abutting engagement with shoulder 114 upon the threaded engagement of pin connector 110 and box connector 128 as hereinafter described.

In operation, pin connector 110 on tubular member 102 is stabbed into box connector 128 of tubular member 104. Upon the engagement of the thread profiles 118, 136, one of the tubular members 102, 104 is rotated with respect to the other to threadingly engage the connectors 110, 128. As the threading engagement continues, annular protuberance 122 is received into groove 146. As the connection is fully made up, protuberance 122 is fully received by and landed within groove 146 and terminal end 132 abuts annular shoulder 114. The surfaces of shoulder 145 engage radial terminal end 125 to inhibit sliding therebetween during drilling. The torque is then increased to fully make-up the connection.

Figures 5, 10:
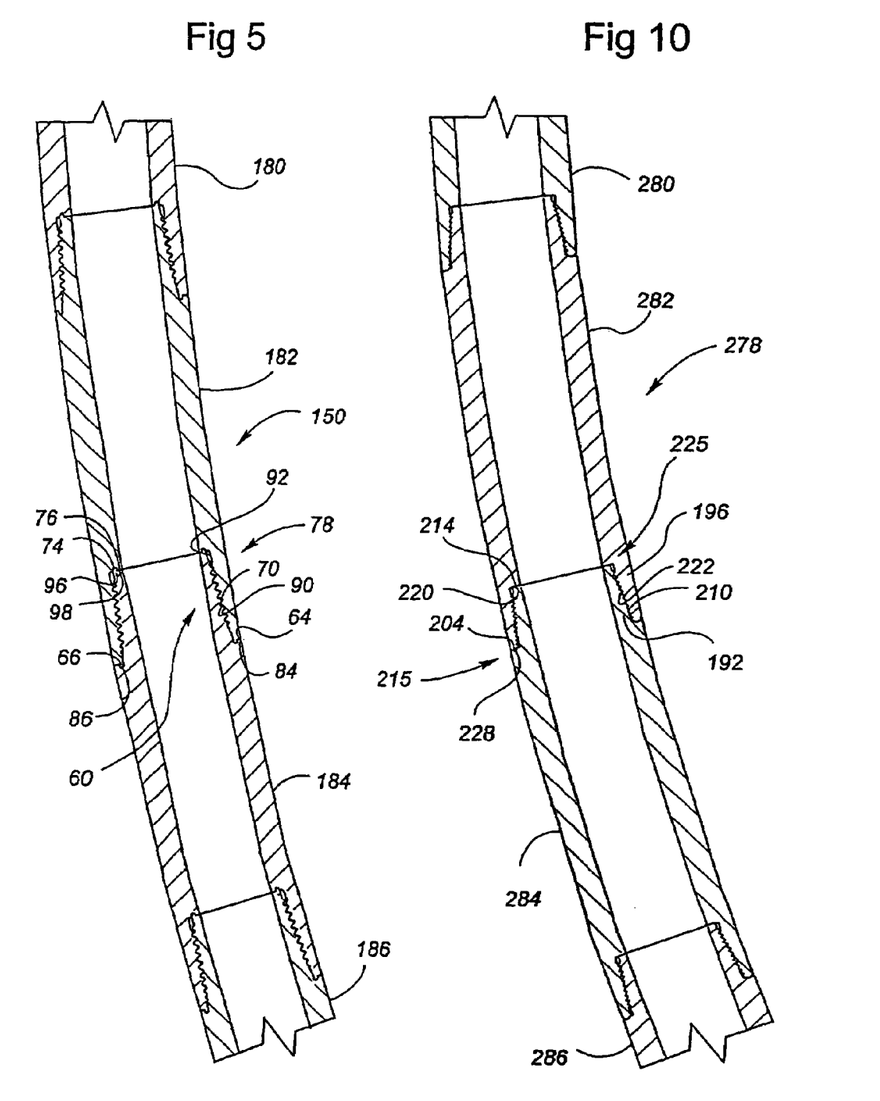
FIG. 5 is an illustrated view of three sections of a tubular string, with the individual tubular members having the connection shown in FIG. 3 of the present invention.
FIG. 10 is an illustrated view of three sections of a tubular string, with the individual tubular members having the connection shown in FIGS. 6 and 7 of the present invention.

Referring now to FIG. 5, there is shown a drill string 150 assembling tubular members 180, 182, 184 and 186 having the preferred connection of FIG. 3 of the present invention. It should be noted that like reference numerals appearing in the various figures refer to like components. It should be appreciated that although the connection of FIG. 3 is illustrated in FIG. 5 that the connection of FIGS. 2 and 4 are also applicable. Tubular members 180, 182, 184 and 186 each have a pin connector 60 and box connector 78 on their respective ends and are threadingly joined by thread profiles 70, 90. For each connection of pin connector 60 and box connector 78, annular protuberance 86 on box connector 78 is received into groove 66 of pin connector 60 and protuberance 74 of pin connector 60 is received into groove 96 of box connector 78. The surfaces of shoulder 65 fully engage radial terminal end 85 and the surfaces of shoulder 95 fully engage radial terminal end 75 to inhibit sliding during drilling. Further collar portions 64, 84 and 76, 98 are in abutting engagement.

In the embodiments of FIGS. 2–5 of the present application, the protuberance was a thin annular ring-like member that was received into a grove to prevent sliding between the surfaces. In the embodiments to be described, the protuberance has a much larger radius and extends across the shoulder and terminal end. A thin protuberance may become damaged in the field before it is fully made up into the groove. If the protuberance becomes damaged, it will not fit properly into the groove. Further, the thin protuberance may be more difficult to manufacture.

Figure 6:
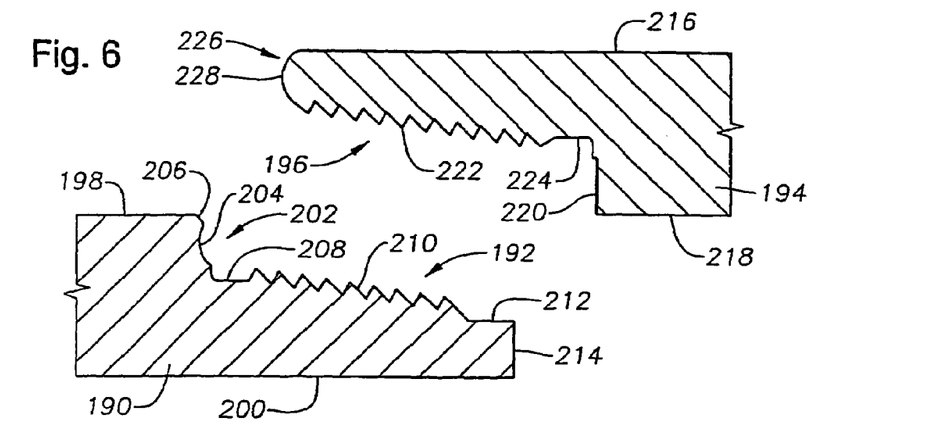
FIG. 6 is a cross-sectional view of the pin and box connectors of another preferred embodiment of the present invention.
Figure 7:
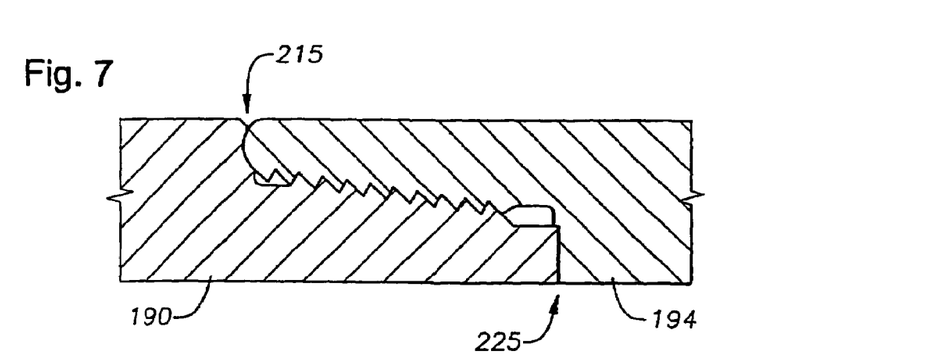
FIG. 7 is a cross-sectional view of the pin and box connectors of FIG. 6 in the engaged position.

Referring now to FIGS. 6 and 7, there is shown another preferred embodiment of the connection of the present invention. In this alternative embodiment, a first tubular member 190 has at one end a pin connector 192 of the present invention and a second tubular member 194 has at one end a box connector 196. The pin connector 192 is adapted for threaded connection to the box connector 196 to form the connection of the present invention as is hereinafter described in further detail. It should be appreciated, of course, that there is a box connector (not shown) on the other end of first tubular member 190 and a pin connector (not shown) on the other end second tubular member 194.

The first tubular member 190 is a generally cylindrical member or pipe having an outer diameter 198 and an inner diameter 200 with the pin connector 192 of the present invention on its terminal end. The pin connector 192 includes an outer annular shoulder 202 having an annular groove or concave radiused surface 204 facing in a direction which is generally transverse to the axis of the tubular member 190. The concave radiused surface 204 extends across the entire shoulder 202. The outer edge of concave radiused surface 204 is chamfered at 206 and the inner edge of concave radiused surface 204 extends to cylindrical surface 208. There should be no sharp outer radial edge on concave radiused groove 204 so that that outer edge is not bent inwardly to prevent the convex radiused surface 228 from being received by concave radiused surface 204.

An external thread profile 210 extends from cylindrical surface 208 at the base of concave radiused surface 204 to cylindrical surface 212 adjacent the radial terminal end 214 of tubular member 190. Preferably the thread profile is a hook load thread The second tubular member 194 is a generally cylindrical member or pipe having an outer diameter 216 and an inner diameter 218 with the box connector 196 of the present invention on its terminal end. The box connector 196 includes an inner annular shoulder 220 facing in a direction which is generally transverse to the axis of the tubular member 194. An internal thread profile 222 extends from cylindrical surface 224 at the base of shoulder 220 to the radial terminal end 226 of tubular member 194. It can be seen that thread reliefs are provided for both thread profiles 210 and 222.

The radial terminal end 226 includes a protuberance or convex radiused surface 228 in the form of a ring-like annular member adapted for insertion into concave radiused surface 204 upon the threaded engagement of pin connector 192 and box connector 196. Convex radiused surface 228 has a cross-section in the shape of a bull nose or arcuate radius. The radius of nose 228 extends across the entire terminal end of box 196 and is slightly smaller, such as by a few thousandths of an inch, than the radius of the concave radiused surface 204 at the base of the pin connector 192. Thus the inserting convex radiused surface 228 is a few thousandth's of an inch smaller than the receiving concave radiused surface 204. This allows the convex radiused surface 228 to easily be received by concave radiused surface 204. Further, the length and radius of the pconvex radiused surface 228 may be varied, which in turn would vary the depth of concave radiused surface 204 with these variables being dependent on the amount of metal-to-metal surface contact desired.

In operation, pin connector 192 on tubular member 190 is stabbed into box connector 196 of tubular member 194. Upon the engagement of the thread profiles 210, 222, one of the tubular members 190, 194 is rotated with respect to the other to threadingly engage the connectors 192, 196. As the threading engagement continues, convex radiused surface 228 is received into concave radiused surface 204. As the connection is fully made up, convex radiused surface 228 is fully received by and landed within concave radiused surface 204 to form a non-sliding radiused surface connection 215 and terminal end 214 abuts annular shoulder 220 to form an abutting shoulder connection 225. The radiused surfaces of shoulder 202 and radial terminal end 226 engage to inhibit sliding during drilling. The torque is then increased to fully make-up the connection.

Figure 8:
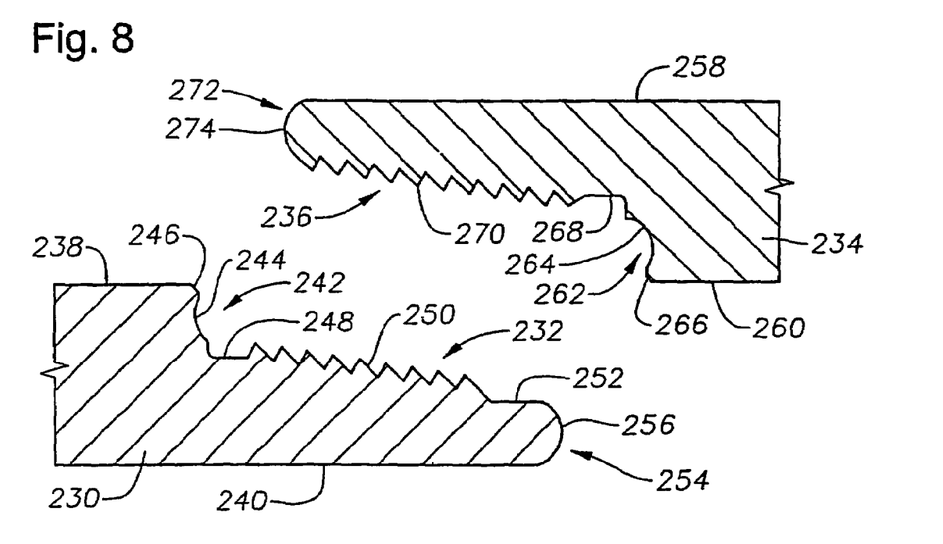
FIG. 8 is a cross-sectional view of the pin and box connectors of a still another preferred embodiment of the present invention.
Figure 9:
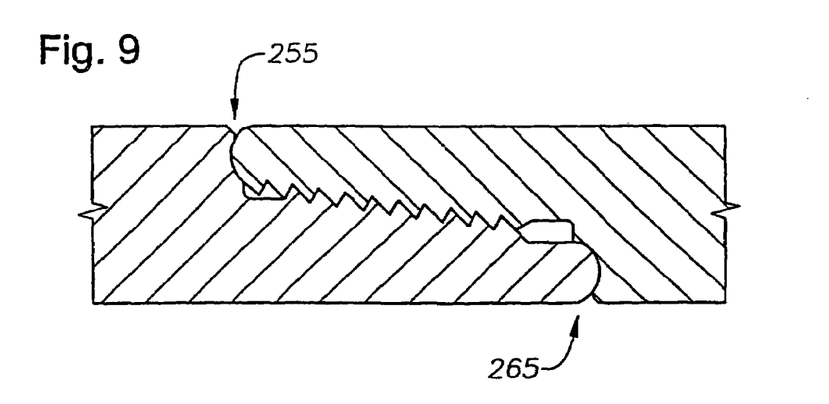
FIG. 9 is a cross-sectional view of the pin and box connectors of FIG. 8 in the engaged position.

Referring now to FIGS. 8 and 9, there is shown still another preferred embodiment of the connection of the present invention. In this alternative embodiment, a first tubular member 230 has at one end a pin connector 232 of the present invention and a second tubular member 234 has at one end a box connector 236. The pin connector 232 is adapted for threaded connection to the box connector 236 to form the connection of the present invention as is hereinafter described in further detail. It should be appreciated, of course, that there is a box connector (not shown) on the other end of first tubular member 230 and a pin connector (not shown) on the other end second tubular member 234.

The first tubular member 230 is a generally cylindrical member or pipe having an outer diameter 238 and an inner diameter 240 with the pin connector 232 of the present invention on its terminal end. The pin connector 232 includes an outer annular shoulder 242 having a groove or concave radiused surface 244 facing in a direction which is generally transverse to the axis of the tubular member 230. The concave radiused surface 244 extends across the entire shoulder 242. The outer edge of concave radiused surface 244 is chamfered at 246 and the inner edge of concave radiused surface 244 extends to cylindrical surface 248. An external thread profile 250 extends from cylindrical surface 248 at the base of concave radiused surface 244 to cylindrical surface 252 adjacent the radial terminal end 254 of tubular member 40.

The radial terminal end 254 includes a protuberance or convex radiused surface 256 which faces in a direction generally transverse to the axis of tubular member 230. Convex radiused surface 256 is a ring-like annular member adapted for insertion into concave radiused surface 264, hereinafter described, upon the threaded engagement of pin connector 232 and box connector 236. Convex radiused surface 256 has a cross-section in the shape of a bull nose or arcuate radius and extends across the entire terminal end 254 of pin connector 232. Convex radiused surface 256 is slightly smaller, such as by a few thousandths of an inch, than the radius of the concave radiused surface 264 at the base of the box connector 236. Thus the inserting radius 256 is a few thousandth's of an inch smaller than the receiving radius 264.

The second tubular member 234 is a generally cylindrical member or pipe having an outer diameter 258 and an inner diameter 260 with the box connector 236 of the present invention on its terminal end. The box connector 236 includes an inner annular shoulder 262 having a annular groove or concave radiused surface 264 which faces in a direction generally transverse to the axis of tubular member 234. Concave radiused surface 264 extends across the entire shoulder 262. The outer edge of concave radiused surface 264 is chamfered at 266 and the inner edge of groove 264 extends to cylindrical surface 268. An internal thread profile 270 extends from cylindrical surface 268 at the base of groove 264 to the radial terminal end 272 of tubular member 234.

The radial terminal end 272 includes a protuberance or convex radiused surface 274 which extends from the end of thread profile 270 to diameter surface 258 and faces in a direction generally transverse to the axis of tubular member 234. Convex radiused surface 256 is a ring-like annular member adapted for insertion into concave radiused surface 264, hereinafter described, upon the threaded engagement of pin connector 232 and box connector 236. Convex radiused surface 274 has a cross-section in the shape of a bull nose or arcuate radius. Convex radiused surface 274 extends across the entire terminal end 272 of box connector 236 and is slightly smaller, such as by a few thousandths of an inch, than the radius of concave radiused surface 244 at the base of the pin connector 232. Thus the inserting radius 274 is a few thousandth's of an inch smaller than the receiving radius 244.

In operation, pin connector 232 on tubular member 230 is stabbed into box connector 236 of tubular member 234. Upon the engagement of the thread profiles 250, 270, one of the tubular members 230, 234 is rotated with respect to the other to threadingly engage the connectors 232, 236. As the threading engagement continues, convex radiused surface 274 on box connector 236 is first received by concave radiused surface 244 of pin connector 232 and convex radiused surface 256 of pin connector 232 is then received into concave radiused surface 264 of box connector 236. As the connection is fully made up, convex radiused surface 274 is fully received by and landed within concave radiused surface 244 to form a non-sliding radiused connection 255 and convex radiused surface 256 is fully received by and landed in concave radiused surface 264 to form another non-sliding radiused connection 265. The torque is then increased to fully make-up the connection. The radiused connections 255 and 265 inhibit sliding between the surfaces during drilling.

Figure 11:
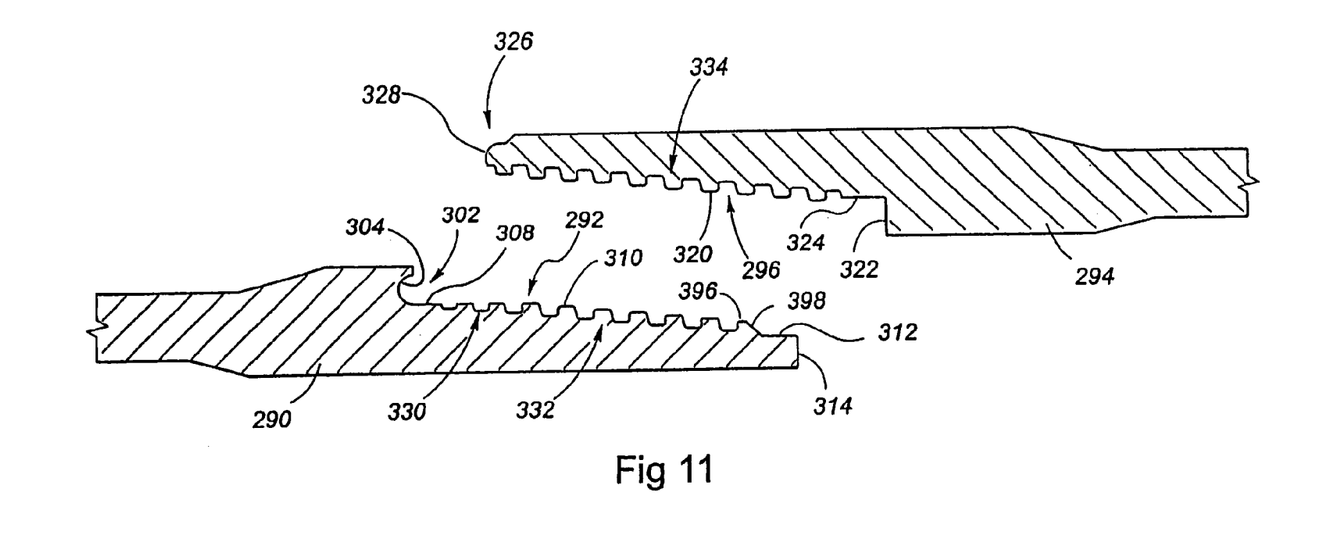
FIG. 11 is a cross-sectional view of the pin and box connectors of the present invention having a preferred embodiment of the thread sets of the connection of the present invention.
Figure 12:
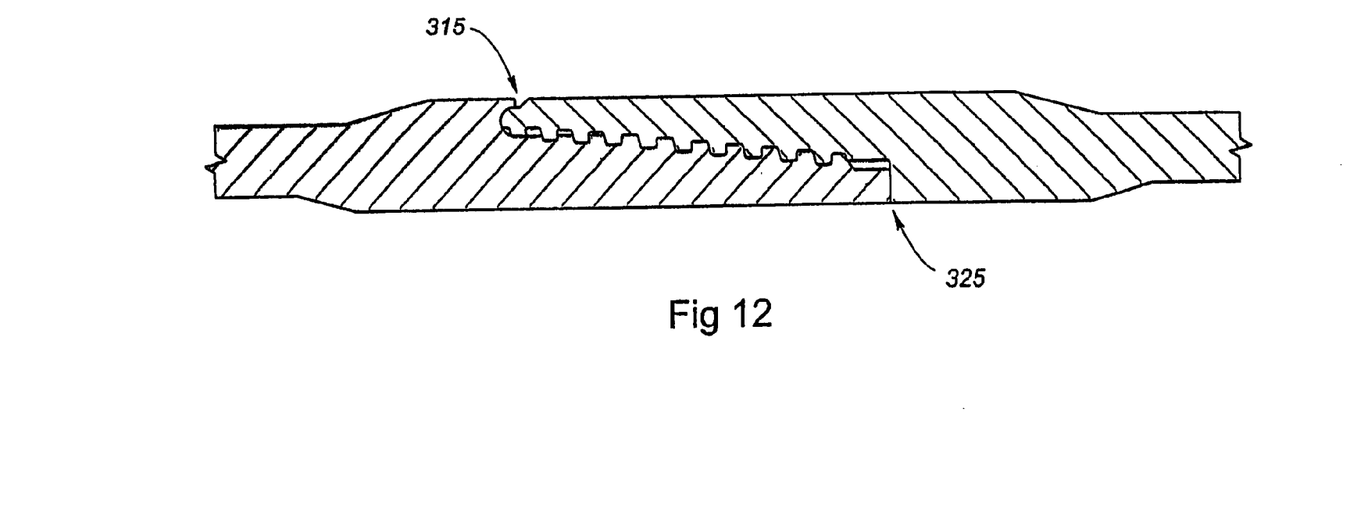
FIG. 12 is a cross-sectional view of the pin and box connectors of FIG. 11 in the engaged position.

Referring now to FIGS. 11 and 12, there is shown the preferred embodiment of the threads for the connection of the present invention. For purposes of illustration, the preferred threads are shown on an embodiment similar to that of FIGS. 6 and 7. A first tubular member 290 has at one end a pin connector 292 and a second tubular member 294 has at one end a box connector 296 with the pin connector 292 adapted for threaded connection to the box connector 296 to form the connection of the present invention as shown in FIG. 12. The pin connector 292 includes at its base an outer annular shoulder 302 having a concave radiused surface 304 extending substantially across the entire shoulder 302. An external thread set 310 extends from cylindrical surface 308 at the base of concave radiused surface 304 to cylindrical surface 312 adjacent the radial terminal end 314 of pin connector 292.

The second tubular member 294 includes at its base an inner annular shoulder 322. An internal thread set 320 extends from cylindrical surface 324 at the base of box base shoulder 322 to the radial terminal end 326 of box connector 296. The radial terminal end 326 includes a protuberance or convex radiused surface 328 in the form of a ring-like annular member adapted for insertion into concave radiused surface 304 upon the threaded engagement of pin connector 292 and box connector 296. The radius of surface 328 extends across the entire terminal end of box 296 and is slightly smaller, such as by a few thousandths of an inch, than the radius of the concave radiused surface 304 at the base of the pin connector 292.

The thread set 310 on pin connector 292 preferably includes a section of run-out threads 330 extending from cylindrical surface 308 to a section of full height threads 332 which extends to the cylindrical surface 312 at pin terminal end 314. A section of run-out threads is understood to mean a portion of threads having their roots machined on a taper with respect to the longitudinal axis of the tubular member, but having their crests machined parallel to the longitudinal axis of the tubular member; gradually the construction (machining) helix of the crests and roots of the threads intersect and the thread disappears.

The thread set 320 on box connector 296 includes a section of full height threads 334 extending from box radial terminal end 326 to cylindrical surface 324 at its base. The run-out threads 330 mate with the full height threads 334 on box connector 296. The run-out threads 330 at the base of the pin connector 292 are reduced height threads to allow the width of the shoulder 302 to be maximized. If the straight line taper of the crest of the threads continues, the thickness of the shoulder is substantially reduced. The cylindrical section 308 of the threads near the base of the pin connector 292 allows an increase in the thickness of the locking shoulder 302. A full run-out thread at the base of the pin connector 292 is not used because that would substantially reduces the thread engagement of the connection. This is a compromise between providing strength in the locking shoulder 302 and sufficient thread engagement for high torque. There is sufficient thread engagement to permit the connection to withstand the shear placed on the connection.

The initial thread 396 on the pin connector 292 is beveled at 398 so that it is not a square thread. If there is a square thread for the initial thread, the stab flank of that initial thread would be damaged during stabbing. This would then damage the other threads during make up. Thus initial thread 396 provides a leading ramp 398 for stabbing the pin connector 292 into the box connector 296.

Figure 13:
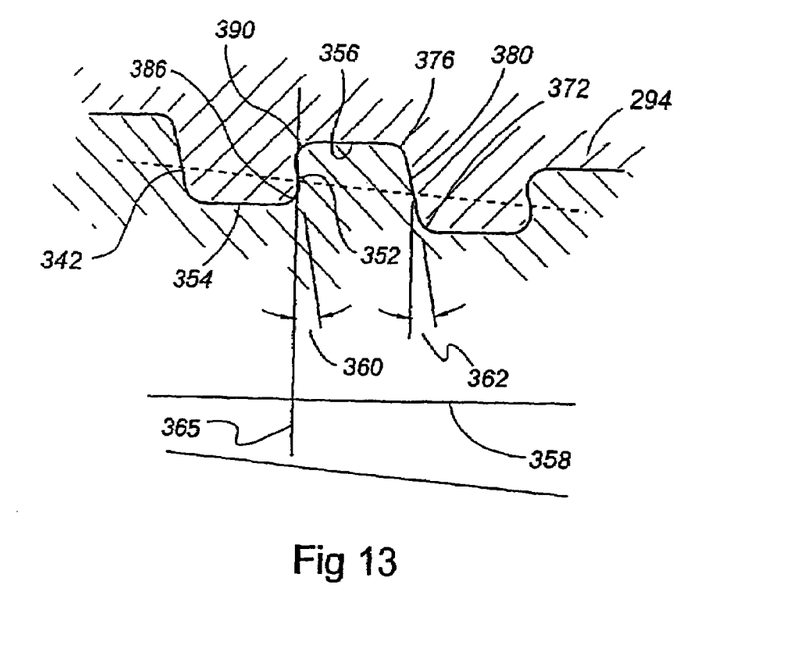
FIG. 13 is a cross-sectional view of the thread set on the box member of the connection shown in FIG. 11.
Figure 14:
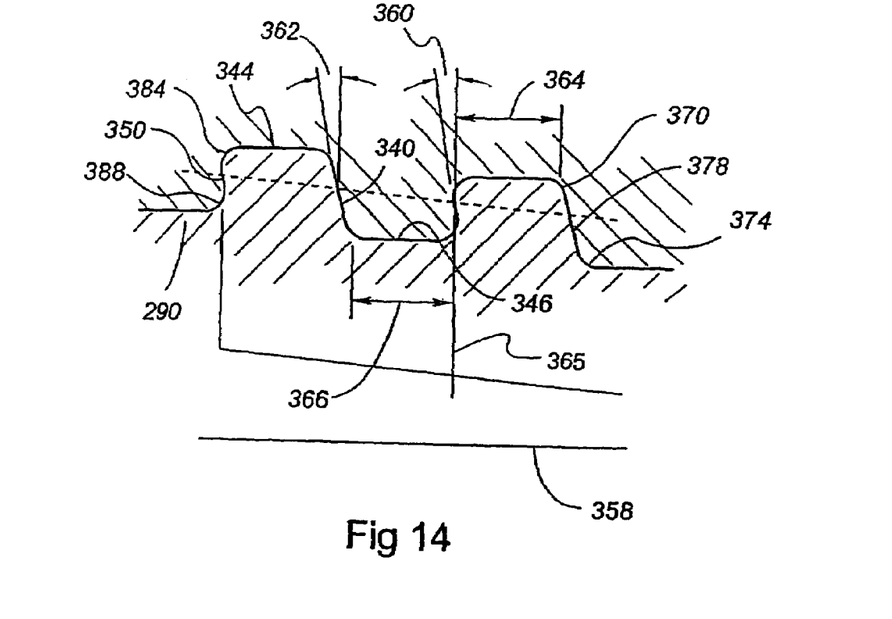
FIG. 14 is a cross-sectional view of the thread set on the pin member of the connection shown in FIG. 11.

Referring now to FIGS. 13 and 14, the pin and box threads sets 310, 320 are shown separated for purposes of description. A stab flank is "positive", when the thread angles away from the adjacent thread groove. A load flank, though generally angled with respect to the axis in the same direction as the stab flank, is "negative", when the thread angles over the adjacent thread groove. A thread flank angle is understood to mean the angle formed between the thread flank and a line which is perpendicular to the longitudinal axis of the connection.

The pin thread set 310 on the pin connector 292 have stab and load flanks 340, 350, respectively, which wind around the cone shaped pin connector 292 in a helix starting from the end of the thread 396 closest to the pin terminal end 314 and, comparably, a box thread set 320 on the box connector 296 with stab and load flanks 342, 352, respectively, which wind around in a helix starting from the end of the thread closest to the box terminal radiused end 326 of the box connector 296. A thread stab flank is understood to mean the more forward or leading flank of the thread when the pin member is telescoped into the box member and the thread load flank is understood to mean the trailing flank of a thread upon telescoping the pin connector 292 into the box connector 296.

The thread sets 310, 320 on the pin connector 292 and box connector 296 have crests 344, 354, respectively, and roots 346, 356, respectively. The thread crest is understood to mean the thread location at which the wall of the tubular member has been machined to its minimum depth and defines the major diameter of a pin thread and the minor diameter of a box thread and the thread root is understood to mean the thread location at which the wall of the tubular member has been machined to its maximum depth and defines the major diameter of the box thread and the minor diameter of the pin thread. The crests 344, 354 and roots 346, 356 are flat and parallel to the axis 358 of the connection to allow a deeper and improved stabbing of the pin connector 292 into the box connector 296. A further advantage is the prevention of cross-threading by allowing the crests 344, 354 to slide over into the roots 346, 356.

To increase the tensile efficiency of the connection, the thread profile is preferably a hook thread with the load flanks 350, 352 having a negative flank angle and the stab flanks 340, 342 having a positive flank angle. The compression efficiency of the connection is provided by the engagement of the shoulders 314, 322 and 302, 326.

The stab flanks 340, 342 preferably have a larger angle to the axis 358 of the connection, or more radial, then the load flanks 350, 352. The angle on the flanks is such that the load flanks 350, 352 are more nearly radial to the axis 358 of the connection then are the stab flanks 340, 342 to provide a crest width 364 that is slightly smaller than the root width or opening 366.

The stab flanks 340, 342 have a larger positive flank angle 360, preferably about 20°, with the perpendicular axis 3654 from the central axis 358 of the tubular members 290, 294. The load flanks 350, 352 have a smaller negative flank angle 362, preferably about 15°, with the perpendicular axis 3654.

The thread crests 344, 354 have a cross-sectional width 364 which is smaller than the cross-sectional width 366 of the thread roots 346, 356. The width 364 and width 366 is measured between regular stab flanks 340, 342 and load flanks 350, 352, respectively. The width 364 of the crests 344, 354 is approximately 0.006 inches less than the width 366 of the roots 346, 356 to provide clearance between the threads and the grooves. A clearance is required between the stab flank 340, 350 to allow sufficient opening at the mouth of the root to permit the negative load flanks 342, 352 to be inserted into the roots 346, 356. With the stab crest corner chamfers 370, 372 in initial engagement to properly align the crests 344, 354 with the roots 346, 356, this clearance is sufficient to allow the threads to move into the grooves as they are rotationally assembled.

The stab flanks 340, 342 preferably have stab crest corner radiuses 370, 372 and stab root corner radiuses 374, 376 with a tapered flank portion 378, 380, therebetween, respectively. The stab crest corner radiuses 370, 372 are larger than the stab root corner radiuses 374, 376. It is desirable for a larger radius to pass into a smaller radius to avoid the threads from locking up. The differential radius also forms a gap or clearance 392 between the stab crest corner radiuses 370, 372 and the stab root corner radiuses 374, 376 allowing foreign matter such as thread compound to be housed in the clearance 392. The stab crest corner radiuses 370, 372 allow the crests 344, 354 to slide into the roots 346, 356 with very minimum clearance and to translate into the openings 366 of the roots 346, 356 without binding as a result of any miss-alignment, eccentricities or other deviation of actual pipe from perfect cylinders. As the connection is made up, the threads move into the accommodating grooves because as one member is rotated with respect to the other, the diameter of the pin threads becomes larger and the diameter of the box threads smaller (as a function of the taper of the respective cones) causing the crests 344, 354 to move toward and into the openings 366 of the roots 346, 356. The crest corner radiuses 370, 372 ensure that there is adequate travel clearance to stab the threads into the grooves, move the threads to the openings of the grooves and then guide the threads into the grooves.

The stab crest corner radiuses 370, 372 preferably also have a "positive" angle to help self-center the advancing pin connector 292 into the box connector 296 without unnecessarily engaging the edges of the threads as described in U.S. Pat. No. 5,462,315. The stab crest corner radiuses 370, 372 on the full height threads allow several of the threads on the pin connector 292 and box connector 296 to be in engagement and alignment prior to rotational assembly. Desirably, at least half of the threads are so engaged. Preferably the pin connector 292 is inserted at approximately 65% to 70% of the depth of the box connector 296 to allow a very deep stab before the initial engagement of the threads.

The pin crests 344 and box roots 356 have a radial interference at 382. The box crests 354 and pin roots 346 have a clearance 402 of approximately 0.002 of an inch. A 0.002 of an inch clearance between the box crests 354 and pin roots 346 is required to provide adequate tolerance for cutting the threads during manufacture. Depending upon the actual dimensions, there may be no clearance between the box crests 354 and pin roots 346. In a power tight working condition, the box crests 354 engage the pin roots 346.

Figure 15:
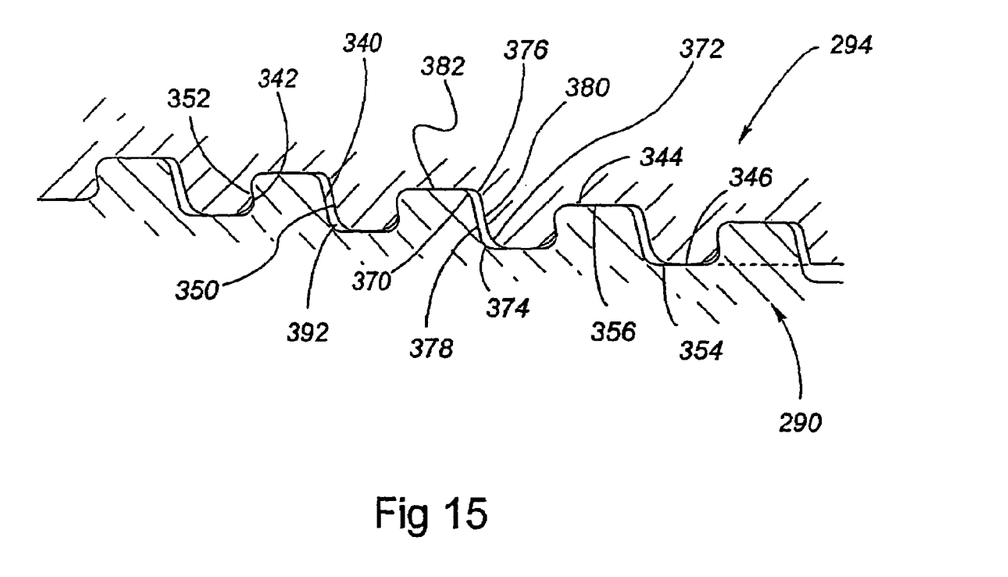
FIG. 15 is an enlarged view of the threads shown in the engaged position in FIG. 12.
Figure 16:
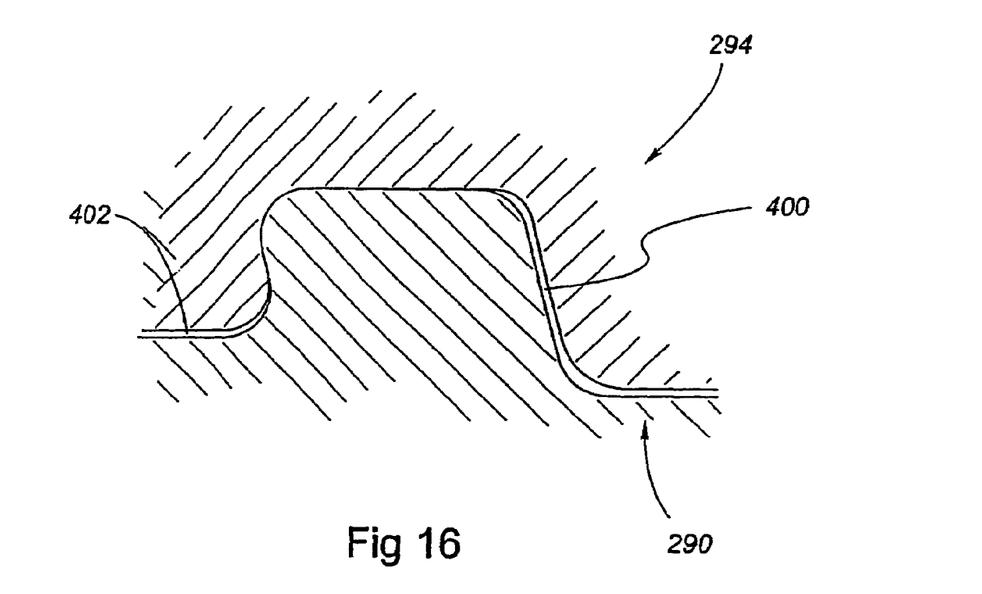
FIG. 16 is an enlarged view of one of the pin and box threads of FIG. 15 in the engaged position.

Referring now to FIGS. 13–16, the load flanks 350, 352 are made up of a load crest radius 384, 386 and a load root radius 388, 390. The load crest radiuses 384, 386 and load root radiuses 388, 390 preferably have the same radius and may have the same radius as the stab root corner radiuses 374, 376. There is no flank or flat in between the radiuses on the load flanks 350, 352 since the load crest radiuses 384, 386 continue into the root radiuses 388, 390, respectively, to form a generally S-shape on the load flanks 350, 352. The crest radiuses 384, 386 are preferably as large as possible to avoid a sharp corner during make-up causing the threads to break. As best shown in FIGS. 15 and 16, the load flanks 342, 352 form locking hook threads which prevent separation upon tension being placed on the connection. FIGS. 15 and 16 show the stab flanks 340, 342 and load flanks 350, 352 in the final made-up position.

The following is a description of the sequential make-up of the connection of the present invention. The assembly process begins by stabbing the pin connector 292 into the box connector 296. The external conical shape of the pin connector 292 and the internal conical shape of the box connector 296 initiates the alignment of the pin connector 292 within the box connector 296. The stab crest corner radiuses 370, 372 on stab flanks 340, 350, respectively, engage after the box connector 292 has received at least half to three-quarters of the pin connector 292. At this stage, the stab flanks 340, 350 are just touching. The depth of the stab can be regulated by the taper and pitch of the threads. The engagement of the stab crest corner radiuses 370, 372 further self-aligns the pin connector 292 within the box connector 296.

The engagement and alignment of the stab crest corner radiuses 370, 372 shifts the pin connector 292 forward within the box connector 296 to provide the necessary stabbing clearance and permit the threads on the pin and box connectors 292, 296 to be moved to and received in the openings of the respective accommodating openings 366 on the corresponding box and pin connectors 292, 296. The convex radiused surface 328 of box radial terminal end 326 has not yet engaged pin concave radiused surface 304 and pin terminal end 314 has not yet engaged box inner annular shoulder 322.

After the initial stab, the threads ride into the roots on the stab flanks until the shoulders engage. Upon engagement of the shoulders, additional torque shifts the engagement of threads from the stab flanks to the load flanks. The shoulders and additional torque drive the load flanks together. The high torque on the load flanks then allows for the application of high tension to the string.

After the initial contact of the stab crest corner radiuses 370, 372, one of the tubular members 290, 294 is rotated with respect to the other with the stab flanks 340, 342 moving into engagement. Rotation at very low torque moves the threads of the pin and box connectors 292, 296 from the stab position to the guide position. As this torque is applied, the connection moves both axially and radially together as the connection makes up. During the initial revolutions or rotations of one member with respect to the other member, the threads travel toward the mouths 366 of the roots 346, 356 and the stab crest corner radiuses 370, 372 guide the flat flanks 378, 380 on stab flanks 340, 350 into engagement. The guidance by the stab crest corner radiuses 370, 372 stops after there have been a sufficient number of rotations whereby the thread diameter has increased a distance equal to the step height between adjacent threads. The crests 344, 354 have now been received by the accommodating grooves 366 of roots 346, 356. Initially only the stab flanks 340, 350 are in contact. The load flanks 342, 352 have a clearance therebetween.

As additional rotation occurs, the threads are guided by flat flanks 378, 380 into the roots 346, 356 with the threads still riding on the stab flanks 340, 350. The pin connector 292 rotates freely within the box connector 296 because there is little or no interfering surfaces either in the threads or in the shoulders. This relatively free rotation continues until the box convex radiused surface 328 engages the pin concave radiused surface 304 and the pin radial terminal end 314 engages the box inner annular shoulder 322. This is the initial interference between the pin connector 292 and box connector 296. Power tight torque cannot be applied to the connection until there some interference.

Once the shoulders 326, 302 and 314, 322 engage, the load begins to shifts from the stab flanks 340, 342 to the load flanks 342, 352. This shift is also caused by thread interference developing between the pin and box thread sets 310, 320. As the contact is transferred from the stab flanks 340, 350 to the load flanks 342, 352, the torque begins to increase because of the contact between the terminal ends 328, 304 and 314, 322 of the pin member 290 and box member 294, respectively, and the contact between the load flanks 342, 352.

The shift of the threads from stab-flank engagement to load-flank engagement causes a clearance 400 between stab flanks 340, 350. Thus, power tight torque must be applied to continue the rotational make-up of the connectors 292, 296 which in turn forces a change in flank contact from stab flanks 340, 350 to the load flanks 342, 352 of the threads. In other words, load flank contact is required to drive, i.e. power torque, the interfering pin and box connectors 292, 296 together.

As the connection is fully made up, convex radiused surface 328 is fully received by and landed within concave radiused surface 304 to form a non-sliding radiused surface connection 315 and terminal end 314 abuts annular shoulder 322 to form an abutting shoulder connection 325. The radiused surfaces of shoulder 302 and radial terminal end 326 engage to inhibit sliding during drilling.

In the final make-up, full power tight position, additional applied make-up torque then seats the box convex radiused surface 328 into the pin concave radiused surface 304. The threads minimally interfere with the complementary mating threads until nearly fully assembled. As additional torque is placed on the connection, the interference contact areas between the pin crests 344 and the box roots 356 increases. After the radiused surface 304 and convex radiused surface 328 are driven together, the box member root 356/pin member crest 344 interferingly engage and the pin member root 346/box member crest 354 may interferingly engage depending on the combination of wall thickness and tolerances of the particular connection. The more torsion that is applied, the greater the interference.

The shoulders 314, 322 and 302, 326 of the connection take the compression and the thread sets 310, 320 of the connection take the tension. Sealing is not a concern with this kind of pipe. The biggest concerns are tension and high torque.

The negative flank angle 360 of the load flanks 350, 352 locks the pin thread set 310 and box thread set 320 together in tension. Thus, the greater the tension placed on the connection, the greater the locking action between the load flanks 350, 352 of the threads. The negative flank angle no only prevents ramping but also increases the torque capacity of the connection and eliminates ramping such that there is no yielding and over torque. The maximized radiused corners of the threads also prevents fatigue.

The negative flank angle 360 and locking shoulders 302, 328 of the invention locks the connection together. Thus, there is less of a tendency for the thread sets 310, 320 to separate from each other. These features cause the threads to remain locked against each other thereby reducing the problem of yielding and over torque. Further, the load flanks 350, 352 and outer pin crest 344 and box root 356 are also in locking engagement thereby increasing the torque capacity of the connection.

The flat roots 346, 356 and crests 344, 354 provide additional torque due to a maximum taper cone surface contact when the threads are made up. The flat roots 346, 356 and crests 344, 354 also prevents rocking.

The thread profile of the present invention addresses all of the critical elements of the working environment and the weaknesses of the prior art thread designs. The new thread profile prevents ramping, rocking and fatigue of the connection and also allows increased torque and most importantly increase the life of the pipe.

It should be appreciated that the connection of the present invention may be used with other thread profiles. Further, the locking shoulders 320, 328 could be used with a standard thread.

Other types of threads which may be used with the connection of the present invention include a standard 30° V thread with a radius root and a radius crest, a thread with a 45° angle on the stab flank and a 30° angle on the load flank, or a thread with a 3 or 4° reverse angle load flank (a hook load flank) and a 7° stab flank. It is preferred in a multi-make-up type connection that the threads have a steep taper typically starting at two inches per foot. With a steep taper, the pin member stabs deeper into the box member before engagement of the threads thereby requiring less time for make-up. This also lessens wear on the threads.

The hook load thread is by far the better connection once made up because it tends to prevent sliding between the surfaces of shoulder and radial terminal end. However, the hook load thread does not wear as well as the V thread because of the large number of makes and breaks of the connection.

Other types of threads may also be used in the connection. It should be understood that any type of a quick, robust, industry standard thread may be used. The connection may use a square thread, a hook load thread, or a V type thread. Other types of thread profiles applicable to the present invention include buttress, acme, premium, and other types of threads. The threads are typically dictated by the customer.

Referring now to FIG. 10, there is shown a drill string 278 assembling tubular members 280, 282, 284 and 286 having the preferred connection of FIGS. 6 and 7 of the present invention. It should be noted that like reference numerals appearing in the various figures refer to like components. It should be appreciated that although the connection of FIGS. 6 and 7 is illustrated in FIG. 10 that the connection of FIGS. 8 and 9 is also applicable. Tubular members 280, 282, 284 and 286 each have a pin connector 192 and box connector 196 on their respective ends and are threadingly joined by thread profiles 210, 222. For each connection of pin connector 192 and box connector 196, convex radiused surface protuberance 228 on box connector 196 is received into concave radiused surface 204 of pin connector 192 to form a rotary non-sliding radiused connection 215 and abutting shoulder 214 of pin connector 192 is abuts shoulder 220 of box connector 196 to form an abutting shoulder connection 225.

Referring now to FIGS. 11–16, there is shown the preferred threads for the connection of the present invention.

The contoured concave and convex radiused surfaces provide a much greater contact surface than that of the prior art. Because there is more metal-to-metal contact and the mass of the metal is increased, there is less tendency for the two contoured radiused surfaces to slide against each other during over-torquing and cyclic bending. The engaging contoured radiused surfaces act like mating bearing surfaces. The radiused shoulders of the embodiments of FIGS. 6–10 tend not to lock but prevent the shoulders from sliding back and forth against each other as the pipe bends. This minimizes the yielding of the terminal end of the box connector during the cycling motion of the drill string.

Upon make-up, the terminal end of the box connector engages the outer shoulder of the pin connector first and then after a further travel of a few thousandths of an inch, the terminal end of the pin connector engages the inner shoulder of the box connector upon full make-up. Thus, the terminal end of the box connector and the outer shoulder on the pin connector will give upon full make-up. Although there is interference, it is not the type of planned interference, such as in an oil field premium connection, where a metal-to-metal seal is formed for sealing fluid pressure. The objective of landing the terminal end of the box connector first is to take some compression off of the pin connector which tends to be the member that yields first.

Increased torque is applied to the connection of the present invention in order to properly engage the thread profiles and join the cooperating shoulders together. The preferred amount of torque depends upon the size of the connection. For example, the present invention is typically used on pipe sizes of 2⅜$^{th}$'s and larger. A 2⅜$^{th}$'s inch size has a preferred torque 2,400 to 2,500 foot-pounds.

In the drilling operation, the drill string is placed into a bore hole with a high deviation. Further, it should be appreciated that the number of joined tubular members may be several thousand. Therefore, the forces applied to the various pin and box connections is very significant. The connection of the present invention assures that the thread profiles are engaged. Further, the buckling forces are controlled by the mating radiused surfaces and the mating collar portions and shoulders. Also, the tubular members can then be used to pull a reamer back through the bore hole. The tubular members may be used multiple times.

The connection of the present invention solves the prior art problems and deficiencies by having a single convex radiused surface located on the pin connector, or a single convex radiused surface located on the box, or having a convex radiused surface located on both the box and pin connectors. The mating radiused shoulders keeps the pin or box connectors from expanding as opposed to prior art connections. The convex radiused surface is adapted for cooperation with the concave radiused surface which in turn allows for more metal-to-metal contact between the two tubular members which provides more metal to strength the connection thereby precluding flaring out of the box. Further, the thread profiles are kept properly engaged thereby preventing the rocking seen in prior art connections. Moreover, even if the terminal end of the box connector flares, the thread profiles will be kept engaged. This allows for multiple uses and prevents the failure of the pin connector while the drill string is in use.

Changes and modifications in the specifically described embodiments can be carried out without departing from the scope of the invention which is intended to be limited only by the scope of the appended claims.

I claim:

1. A method of making up a tubular connection, comprising:
    stabbing a threaded pin member into a threaded box member, said pin member including pin threads and said box member having box threads, said pin threads having stab flanks and load flanks and said box threads having stab flanks and load flanks;
    engaging corner radiuses on the stab flanks of the pin threads and the box threads;
    forming a clearance between said threads;
    rotating the pin and box members relative to each other;
    guiding said threads on the pin and box members within accommodating grooves on the corresponding pin and box member;
    engaging contours radiused surfaces on an end of the box member and a base of the pin member;
    shifting load from the stab flanks to the load flanks on the threads of the pin member and the box member; and
    locking up the radiused surfaces the radiused surfaces fully contacting each other along the contours.

2. The method of claim 1 further including centering the pin member within the box member.

3. The method of claim 1 further including stabbing the pin member at least halfway into the box member before the corner radiuses engage.

4. The method of claim 1 further including engaging the stab flanks and not engaging the load flanks as the threads are guided into the grooves.

5. The method of claim 1 wherein the engagement of said radiused surfaces causes the load to shift from the stab flanks to the load flanks.

6. The method of claim 1 further including forming a locking shoulder between the pin base and box end.

7. The method of claim 1, wherein said box member has a box base and said pin member has a pin end, said method further including engaging the pin end and box base to form a locking shoulder.

8. The method of claim 1 further including engaging the pin end and box base to form a locking shoulder prior to said shifting load from the stab flanks to the load flanks.

9. A method of making up a tubular connection, comprising:
   stabbing a threaded pin member into a threaded box member, said pin member including pin threads and said box member including box threads, said pin threads having stab flanks and load flanks and said box threads having stab flanks and load flanks;
   engaging corner radiuses on the stab flanks of the pin threads and the box threads;
   forming a clearance between said threads;
   rotating the pin and box members relative to each other;
   guiding said threads on the pin and box member within accommodating grooves on the corresponding pin and box members;
   engaging contours radiused surfaces on an end of the pin member and a base of the box member;
   shifting load from the stab flanks to the load flanks on the threads; and
   locking up the radiused surfaces the radiused surfaces fully contacting each other along the contours.

10. The method of claim 9 further including centering the pin member within the box member.

11. The method of claim 9 further including stabbing the pin member at least halfway into the box member before the corner radiuses engage.

12. The method of claim 9 further including engaging the stab flanks and not engaging the load flanks as the threads are guided into the grooves.

13. The method of claim 9 wherein the engagement of said radiused surfaces causes the load to shift from the stab flanks to the load flanks.

14. The method of claim 9, wherein said box member has a box end and said pin member has a pin base, said method further including forming a locking shoulder between the pin base and box end.

15. The method of claim 9 further including engaging the pin end and box base to form a locking shoulder.

16. The method of claim 9 further including engaging the pin end and box base to form a locking shoulder prior to said shifting load from the stab flanks to the load flanks.

17. A method of making up a tubular connection, comprising:
   stabbing a threaded pin member into a threaded box member, said pin member including pin threads and said box member having box threads, said pin threads having stab flanks and load flanks and said box threads having stab flanks and load flanks;
   engaging corner radiuses on the stab flanks of the pin threads and the box threads;
   forming a clearance between said threads;
   rotating the pin and box members relative to each other;
   guiding said threads on the pin and box members within accommodating grooves on the corresponding pin and box member;
   engaging contours radiused surfaces on an end of the box member and a base of the pin member;
   engaging radiused surfaces on an end of the pin member and a base of the box member;
   shifting load from the stab flanks to the load flanks on the threads of the pin member and box member; and
   locking up the radiused surfaces the radiused surfaces fully contacting each other along the contours.

18. The method of claim 17, wherein said box member has a box end and box base and said pin member has a pin end and pin base, said method further including engaging the pin end and box base to form a first non-sliding locking shoulder, said method further including engaging the box end and pin base to form a second non-sliding locking shoulder.

19. The method of claim 17 wherein the engagement of said radiused surfaces causes the load to shift from the stab flanks to the load flanks.

20. The method of claim 17 further including engaging the pin end and box base to form a first non-sliding locking shoulder, and engaging the box end and pin base to form a second non-sliding locking shoulder, prior to said shifting load from the stab flanks to the load flanks.

* * * * *